United States Patent [19]

Yamaguchi

[11] Patent Number: 5,089,765
[45] Date of Patent: Feb. 18, 1992

[54] BATTERY CHARGER AND CHARGING METHOD

[75] Inventor: Katsushi Yamaguchi, Fuchu, Japan

[73] Assignee: Ryobi Limited, Hiroshima, Japan

[21] Appl. No.: 556,499

[22] Filed: Jul. 24, 1990

[30] Foreign Application Priority Data

Aug. 11, 1989 [JP] Japan .................................. 1-209213

[51] Int. Cl.⁵ .............................................. H02J 7/04
[52] U.S. Cl. ........................................ 320/32; 320/39
[58] Field of Search ...................... 320/31, 32, 35, 37, 320/39

[56] References Cited

U.S. PATENT DOCUMENTS

| | | | |
|---|---|---|---|
| 4,629,964 | 12/1986 | Ball | 320/32 X |
| 4,667,143 | 5/1987 | Cooper et al. | 320/32 X |
| 4,695,784 | 9/1987 | Reynolds | 320/32 |
| 4,843,299 | 6/1989 | Hutchings | 320/31 |

FOREIGN PATENT DOCUMENTS 1-186130  7/1989  Japan .

*Primary Examiner*—Steven L. Stephan
*Assistant Examiner*—Kristine Peckman
*Attorney, Agent, or Firm*—Lowe, Price, LeBlanc & Becker

[57] ABSTRACT

A battery charger capable of keeping the effective value of the charging current constant regardless of the supply voltage. The effective value of the charging current is measured by the shunt resistance connected in series with the battery, and the conduction angle of the charging current is controlled according to the measured effective value.

5 Claims, 9 Drawing Sheets

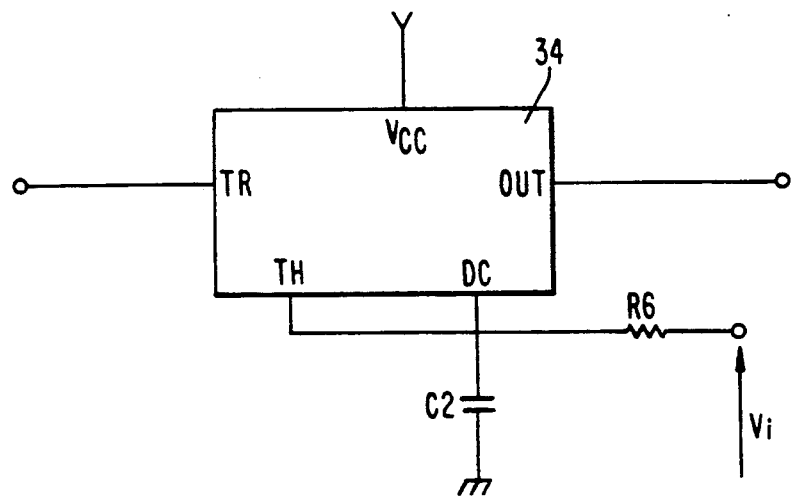
Fig. 8
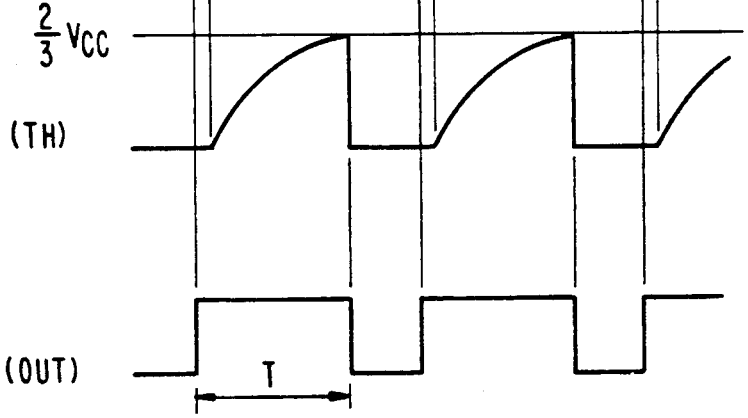

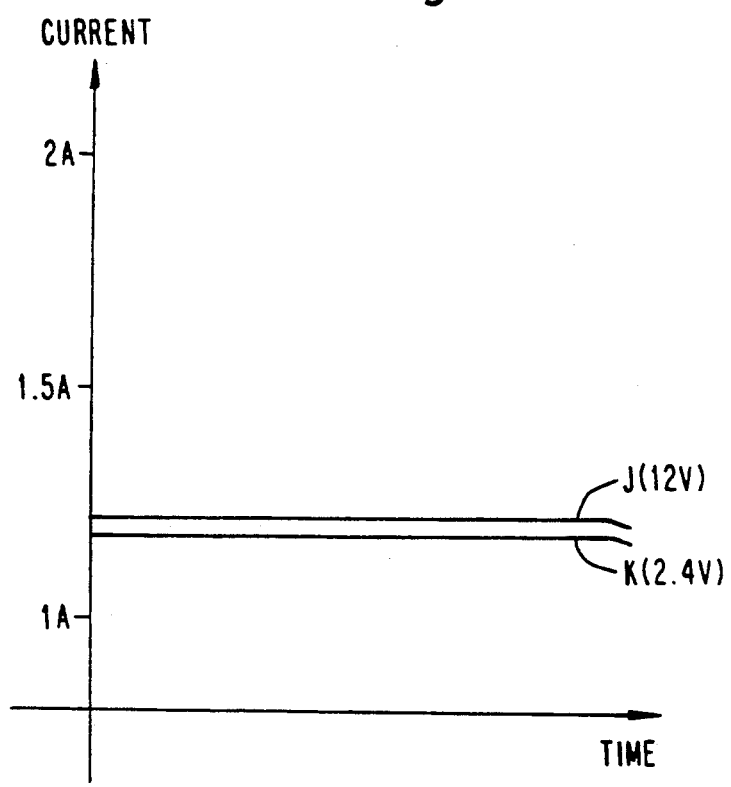

BATTERY CHARGER AND CHARGING METHOD

BACKGROUND OF THE INVENTION

1. Field of the Invention

The present invention relates to a charging technology of batteries, and more particularly to an enhancement of its reliability and versatility.

2. Description of the Prior Art

A conventional battery charger is shown in FIG. 1. The portion enclosed by a single-dot chain line is a battery 2. Inside the battery 2, there are laminated cells 4 and a thermostat 6. Usually, one cell 4 has a nominal output of 1.2 V, and the battery voltage is determined by the number of the cells 4 that are laminated. Generally, batteries in a range of nominal voltage of 2.4 V to 12 V are widely used. The thermostat 6 is designed to detect the completion of charging by elevation of temperature.

A commercial alternating-current input of 100 V (or 200 V) is converted to a value suited to charging the battery 2 by means of a transformer 8. The alternating-current output the transformer 8 is rectified by diodes 10 and 12, and is applied to the battery 2. As the battery 2 is being charged, the temperature of the battery 2 goes up. The thermostat 6 is preset to open at a temperature near the end of charging. When the thermostat 6 is open, a detecting circuit 14 turns off an SCR 16, thereby stopping charging.

The conventional battery charger, however, exhibits the following problems.

First, the output voltage of the transformer 8 must be varied depending on the nominal voltage of the battery to be charged. This is because the battery 2 may be damaged or may not be charged if the battery is charged at an improper voltage. Accordingly, for every different nominal voltage of the batteries, an exclusive charger must be prepared, and the terminal and other shapes must be changed so as to prohibit use in improper combinations. As a result, the manufacturing cost is increased.

Second, the charger is easily influenced by the fluctuations of the supply voltage (about 10% in the commercial power supply). That is, as the supply voltage becomes higher, the charging current increases. As a result, the heat generation per unit time of the transformer 8 of the charger or the diodes 10, 12 or SCR 16 increases, which may lead to their deterioration or destruction.

Japanese unexamined patent publication HEI 1-186130 discloses a battery charger where above problems are solved. FIG. 2 shows a circuit diagram of the battery charger. In this battery charger, the value of the charging current flowing to the battery 2 is detected by a resistance R5 and then integrated by an integrating circuit 24. That is, an effective value of the charging current flowing to the battery 2 is obtained from the integrating circuit 24. A microcomputer 100 receives the output of the integrating circuit 24. A/D converter 100e converts the integrated charging current level into digital value. Reference value of the charging current has been written in a ROM 100b of the microcomputer 100. The microcomputer 100 controls the conduction angle of SCR 10 and SCR 12 through an output port 100H and a drive circuit 60 depending on the output value of the integrating circuit 24 and the reference value stored in the ROM 100b, to equalize the effective value of charging current with the reference value.

That is, when the output value of the integrating circuit 24 is larger than the reference value stored in ROM 100b, the microcomputer 100 reduces the conduction angle of SCR 10 and SCR 12. When the output value of the integrating circuit 24 is smaller than the reference value stored in ROM 100b, the microcomputer 100 increases the conduction angle of SCR 10 and SCR 12.

The battery charger shown in FIG. 2 can be used commonly regardless of the nominal battery voltage and is not affected by the fluctuations of the supply voltage. It is necessary, however, for controlling the conduction angle of the SCR's to use the microcomputer 100, which makes results in a complicated structure and high-cost of the battery charger. Further, there is the possibility of unusual program running when the microcomputer is used in a noisy or high temperature environment. Accordingly, it is desired to present a reliable battery charger which is capable of controlling the conduction angle without the microcomputer.

SUMMARY OF THE INVENTION

It is hence a primary object of the invention to present a reliable battery charger that can be used commonly regardless of the nominal battery voltage with a simple structure and without the microcomputer.

Battery charger in accordance with the present invention comprises:

a rectifier circuit for rectifying an alternating current to obtain a rectified output, a conduction angle control circuit for controlling a conduction angle of the rectified output to apply to a battery, on the basis of a given current signal and a zero-crossing signal, a current effective value calculating circuit for calculating an effective value of a charging current to deliver the current signal showing the effective value, and a zero point detecting circuit for detecting a zero point of the rectified output from the rectifier circuit to deliver the zero-crossing signal to the conduction angle control circuit.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 8 is a diagram for explaining the operation of a timer IC 34, FIGS. 9A to 9E are waveform diagrams of each terminals of the timer IC 34 in FIG. 8, FIG. 13 is a graph showing the effect of the correction circuit.

DETAILED DESCRIPTION OF THE PREFERRED EMBODIMENTS

Figure 1:
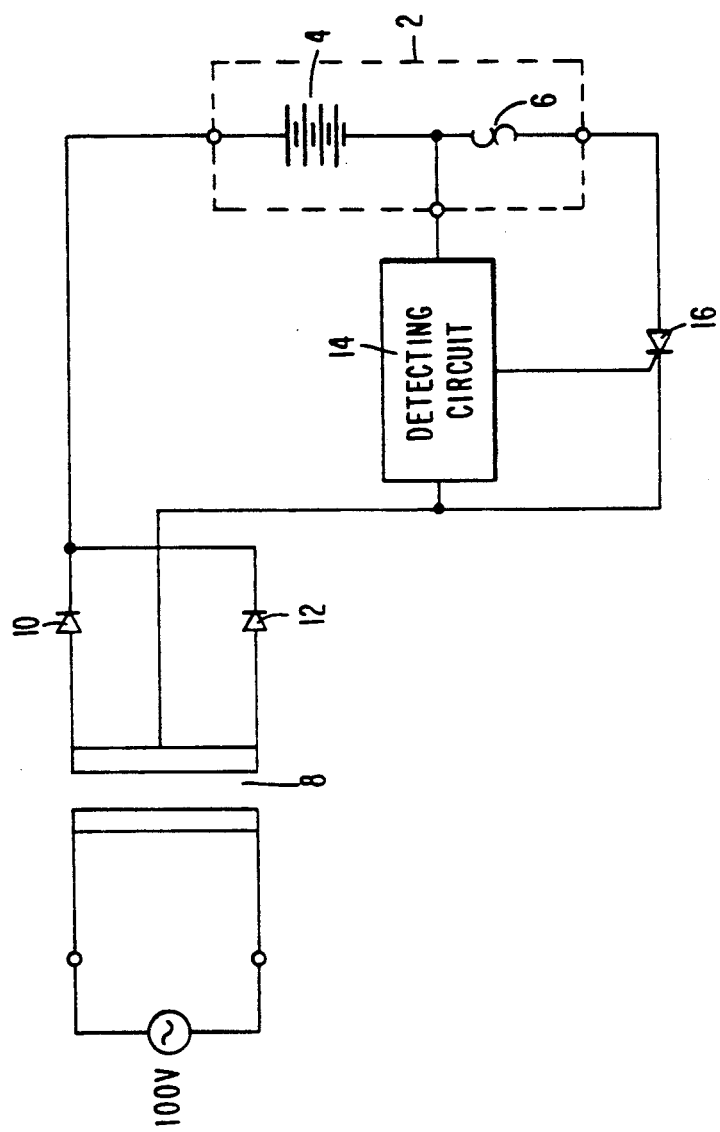
FIG. 1 is a circuit diagram of a conventional charger.
Figure 2:
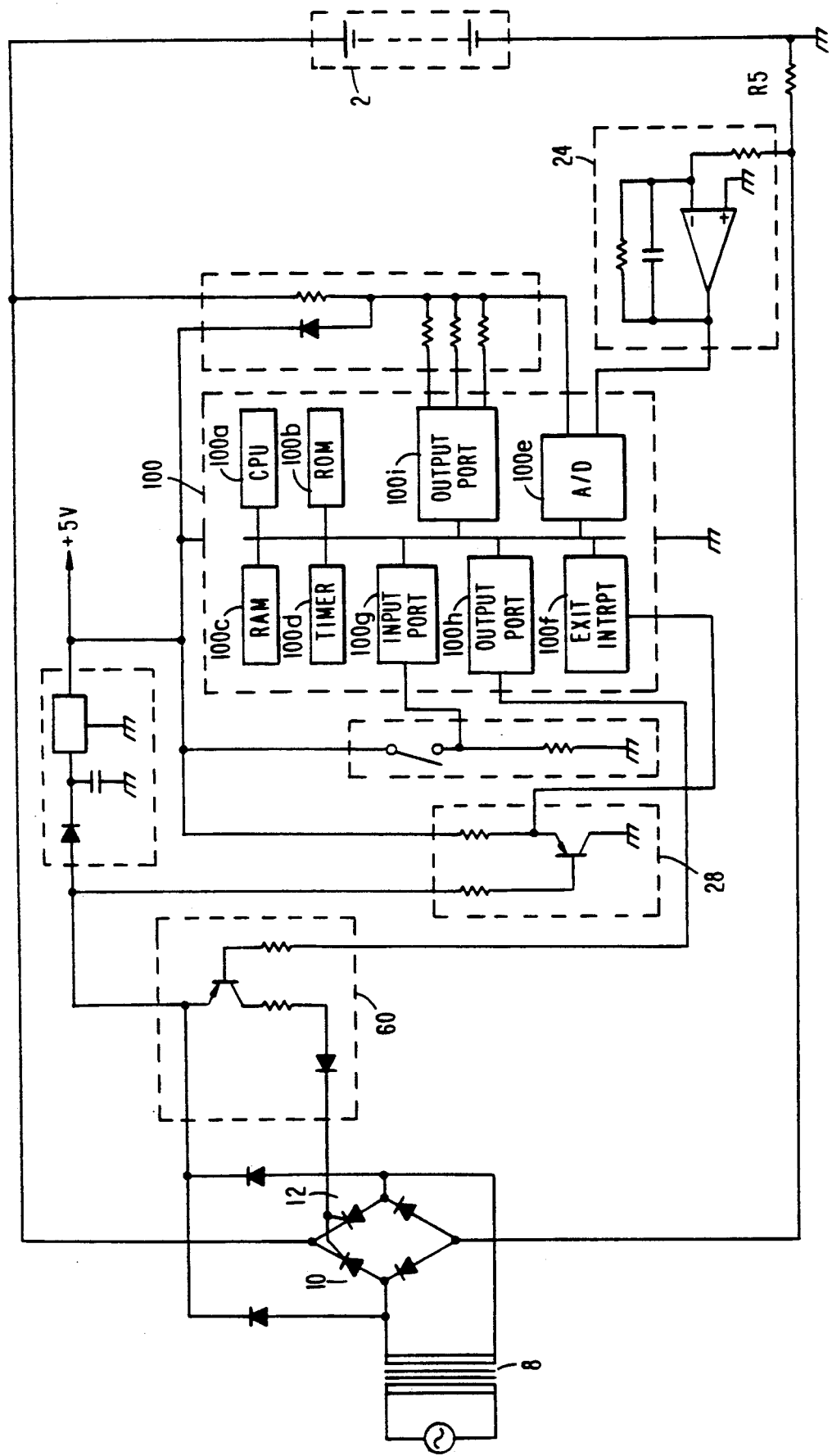
FIG. 2 is a circuit diagram of another conventional charger.
Figure 3:
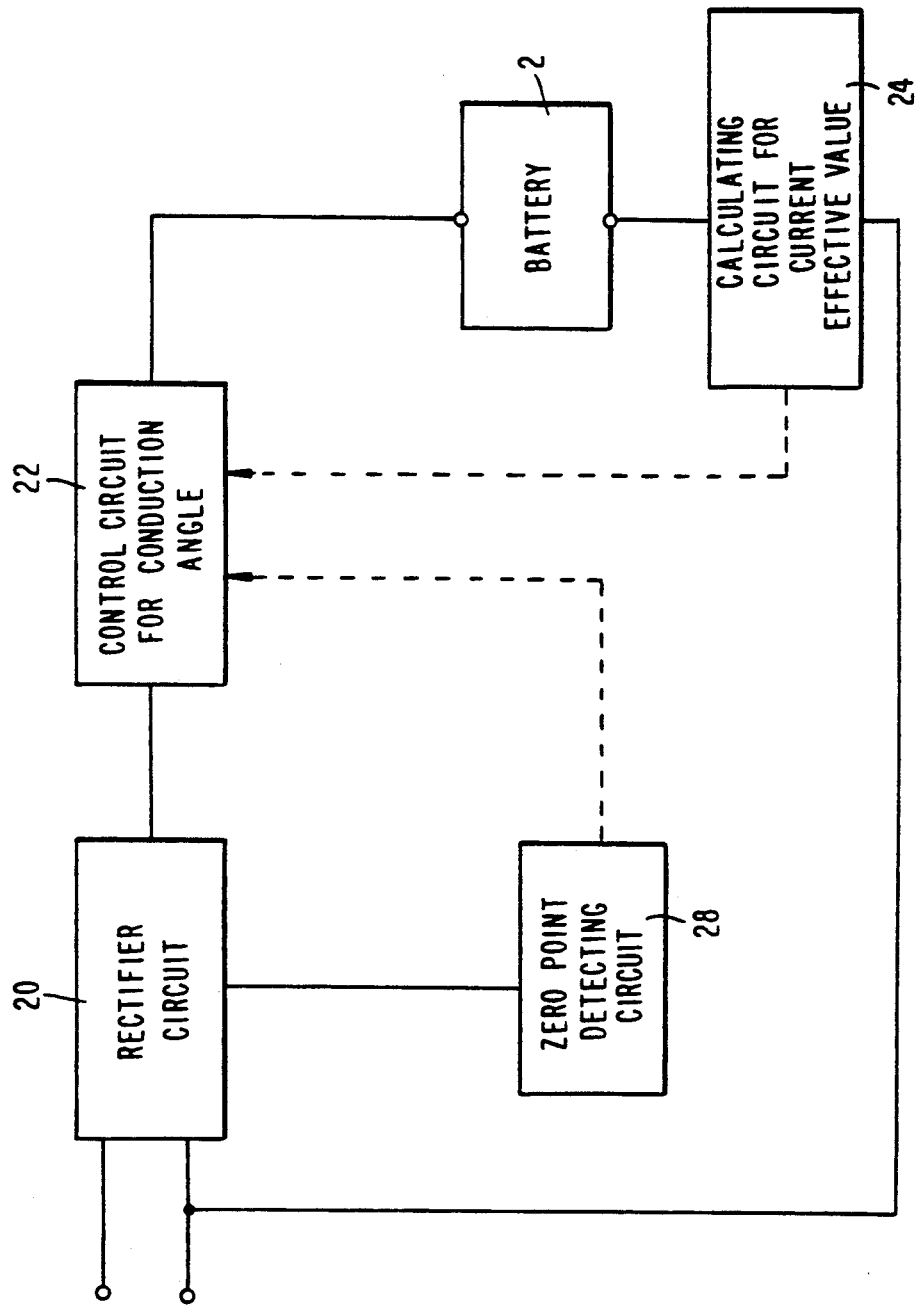
FIG. 3 is a drawing showing an entire structure of a battery charger of the invention.

The entire structure of the battery charger of the invention is shown in FIG. 3. The charger comprises:

a control circuit 22 for controlling the conduction angle of the rectification output of a rectifier circuit 20, a current effective value calculating circuit 24 for calculating the effective value of charging current and delivering it to the control circuit 22, and a zero point detecting circuit 28 for detecting the zero point of the rectification output and delivering the zero-cross signal to the control circuit 22.

The alternating-current input is rectified in the rectifier circuit 20, and is supplied to the control circuit 22. The output of the control circuit 22 is given to the battery 2. The effective value of the charging current of the battery 2 is measured by the current effective value calculating circuit 24. This effective value is given to the control circuit 22. On the other hand, the zero point detecting circuit 28 detects the zero point of the rectification output, and applies it as the zero-cross signal to the control circuit 22.

The control circuit 22 is synchronized by the zero-cross signal, and increases or decreases the conduction angle depending on the magnitude of the current effective value from the current effective value calculating circuit 24.

In this way, the effective value of the charging current applied to the battery 2 may be kept constant regardless of the nominal voltage of the battery 2 or the alternating-current input voltage.

Figure 4:
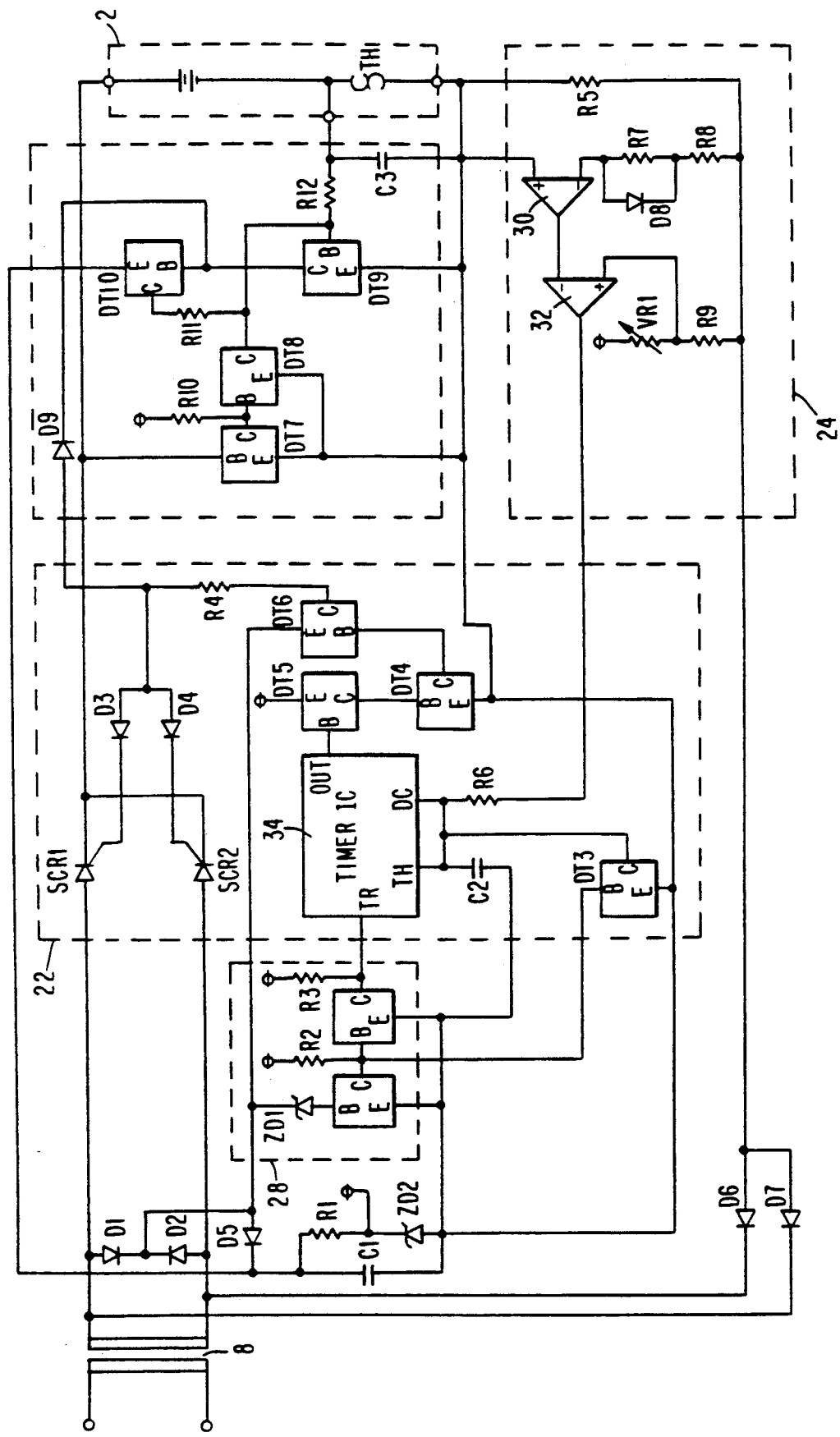
FIG. 4 is a circuit diagram of the battery charger according to one of the embodiments thereof.

FIG. 4 shows a detailed circuit composition of a battery charger according to an embodiment of the invention. In this example, the rectifier circuit is composed of a bridge of diodes D1, D2, D6, D7. The portion corresponding to the block in FIG. 3 is indicated by broken line.

Figure 5:
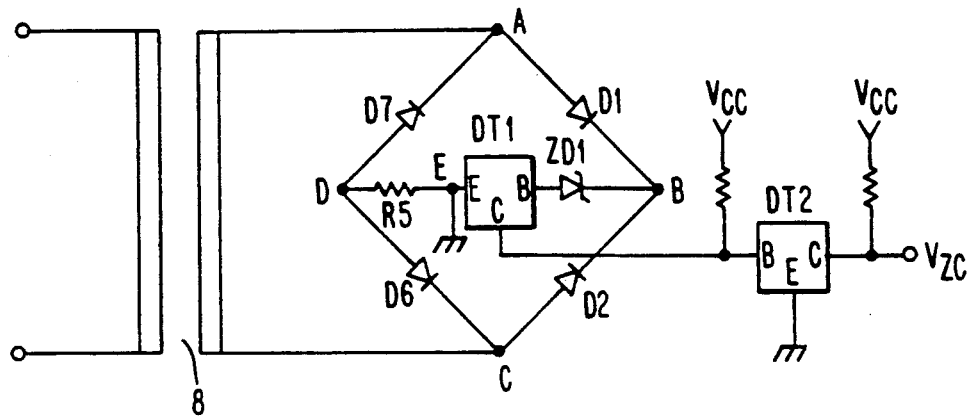
FIG. 5 is a diagram for explaining the operation of a zero point detecting circuit.

Referring first to the zero point detecting circuit 28, the principal parts of this circuit are shown in FIG. 5. A Zener diode ZD1, a switching transistor DT1, and a shunt resistance R5 are connected between points B and D of the diode bridge.

Figure 7:
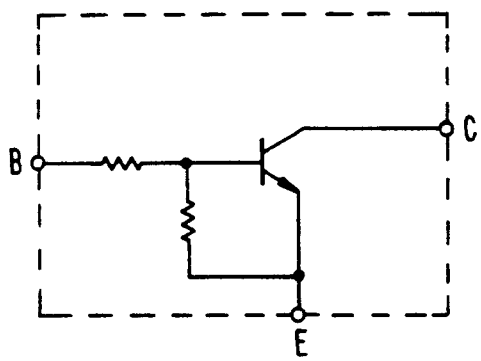
FIG. 7 is a internal circuit diagram of a switching transistor.

The switching transistor DT1 is a transistor with resistance composed for switching purpose. An example of the circuit composition is shown in FIG. 7. Hereinafter, in this embodiment, the switching transistor is expressed in an abbreviated form as shown in FIG. 5.

Figure 6A:
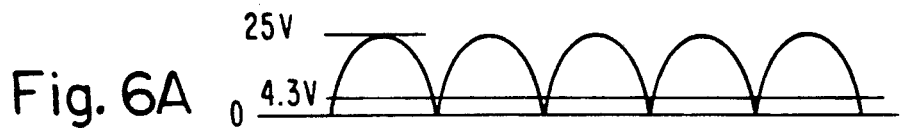
FIGS. 6A to 6C are waveform diagrams of zero point detecting circuit.
Figure 6B:

Regarding the voltage between points B and E in FIG. 5, it is as shown in FIG. 6A. When the BE voltage is lower than the Zener voltage (in this embodiment, 4.3 V) of the Zener diode ZD1, the switching transistor DT1 is OFF, and the voltage of the collector C is H. When the BE voltage is higher than the Zener voltage (4.3 V) of the Zener diode ZD1, the switching transistor DT1 is ON, and the voltage of the collector C becomes L. Therefore, the collector output of the switching transistor DT1 is as shown in FIG. 6B. The output of the switching transistor DT2 is an inverted one (see FIG. 6C). That is, the zero-cross output Vzc which becomes L only in the vicinity of zero of the rectified output is obtained.

On the other hand, the rectified output is given to the battery 2 through the control circuit 22. At the output side of the battery 2, the current effective value calculating circuit 24 for measuring the effective value of the charging current is connected. This calculating circuit 24 comprises shunt resistance R5, integrating circuit 30, resistance R8, substracting circuit 32 and others. Meanwhile, the resistance R7 and diode D8 make up a correction circuit, which is described later in detail. When the charging current flows in the resistance R5, the voltage proportional to the current is generated across the resistance R5. The integrating circuit 30 integrates this voltage and delivers an output depending on the effective value of the charging current.

Figure 10:
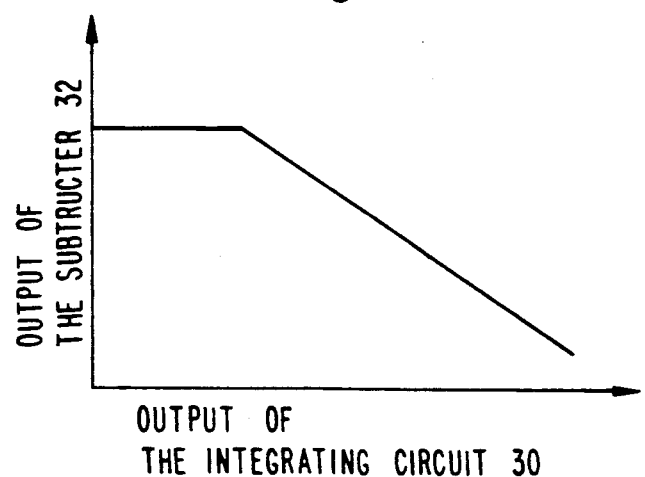
FIG. 10 is a diagram showing the output characteristic of a substracter 32.

This output representing the effective value of the charging current is given to one terminal of the subtracter 32. At the other terminal of the substractor 32, a comparison reference voltage is fed. The relationship between the output of the subtracter 32 and the integrated input is as shown in FIG. 10. As illustrated, the output of the subtracter 32 represents the integrated value, but in nearly inverse proportion. The comparison reference voltage may be adjusted by a variable resistor VR1.

The control circuit 22 is described in detail. This circuit comprises timer IC 34, thyristors SCR1, SCR2, and others. The operation of the timer IC 34 (PC617 of Nippon Electric Corp. is used in this embodiment) is explained in reference to FIG. 8 and FIG. 9. When a pulse as shown in FIG. 9A is supplied to a trigger terminal TR, the output OUT becomes H (see FIG. 9C). In sequence, as the trigger input rises up, a capacitor C2 comes to be charged by the input voltage Vi (see FIG. 9B). As the charging voltage elevates to reach ⅔ of the supply voltage Vcc, the electric charge of the capacitor C2 is discharged through a discharge terminal DC. At the same time, the output OUT becomes L (see FIG. 9C). Thereafter, the same process is repeated, and the output signal OUT which is H only in the period of T is obtained as shown in FIG. 9C. The duration T of the H period of the output signal OUT is determined by the charging time until the charged voltage of the capacitor C2 reaches ⅔ of Vcc. The charging time is also determined by the magnitude of the input voltage Vi. Therefore, by varying the magnitude of the input voltage Vi, the duration T of the H period of the output OUT may be changed. That is, when the input voltage Vi is large, the capacitor C2 is charged promptly, so that the period T is short as shown in FIG. 9D. To the contrary, when the input voltage Vi is small, it takes time to charge the capacitor C2, so that the period T becomes long as shown in FIG. 9E.

Figure 6C:
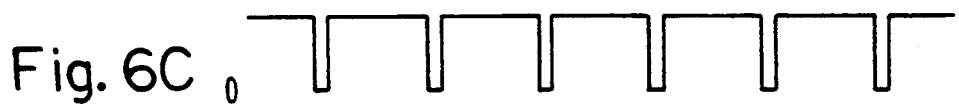

To the trigger input TR of the timer IC 34 operating in that manner, the output of the zero point detecting circuit 28 shown in FIG. 6C is applied. As the input voltage Vi, the output from the subtracter 32 is used. This duration of the H period of the output is inversely proportional to the charging current effective value as mentioned before. Therefore, when the charging current effective value is large, the duration T of the H period of the output OUT of the timer IC 34 becomes long. When the charging current effective value is small, the duration T of the H period of the output OUT of the timer IC 34 becomes short.

The output OUT of the timer IC 34 is applied to the gates of the thyristors SCR1, SCR2 through the switching transistors DT5, DT4, DT6 and diodes D3, D4. The rectified output is supplied to the battery 2 by way of the thyristors SCR1, SCR2, and therefore the charging current flows in the battery 2 only while the output of the timer IC 34 is not H (that is, while L only). The effective value of this charging current is used to determine the duration T of the H period of the output OUT of the timer IC34. Therefore, the feedback control is effected so that the effective value of the charging current becomes the value determined by the variable resistor VR1.

Figure 11A:
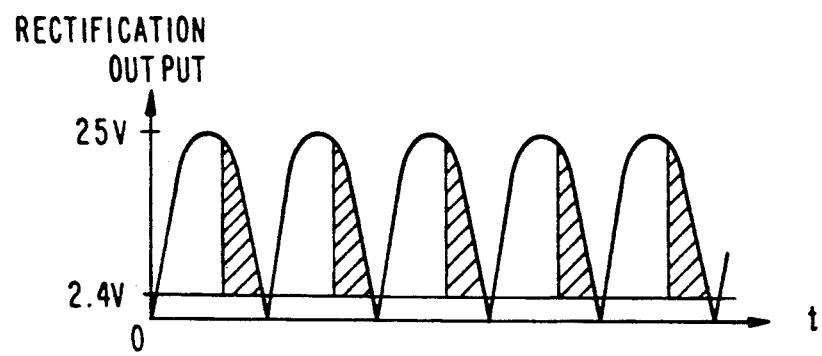
FIGS. 11A to 11D are diagrams showing the operation of the charger to the battery with a small nominal voltage, and the operation of the charger to the battery with a large nominal voltage.
Figure 11B:
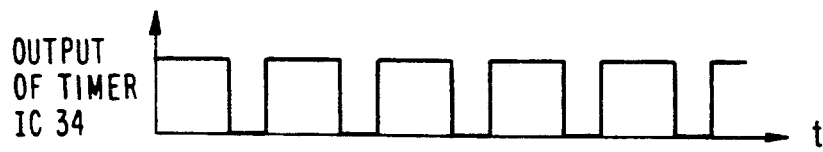
Figure 11C:
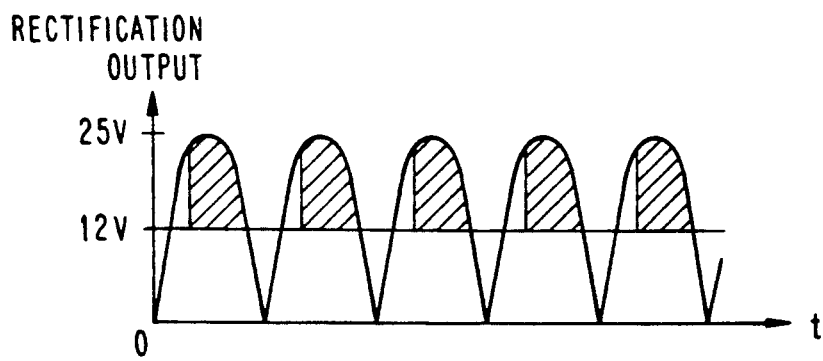
Figure 11D:
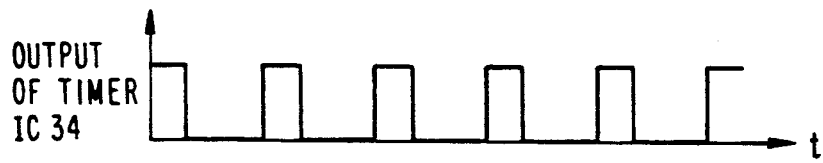

In other words, the effective value of the charging current is kept constant by setting a small conduction angle for a battery with a low nominal voltage, and setting a large conduction angle for a battery with a high nominal voltage. An example of low nominal voltage (for example, 2.4 V) is shown in FIGS. 11A and B. Only when the rectified output exceeds the battery voltage (assuming 2.4 V) and as far as the output OUT of the timer IC 34 is OFF, the charging current flows. The hatched area in FIG. 11A shows the flow of the charging current. When the nominal voltage is high (for example, 12 V), as shown in FIGS. 11C and D, the output of the timer IC 34 is adjusted so that the area of the hatched zone (that is, the effective value) may be same as in FIG. 11A. Namely, when the nominal voltage is high, the period of the rectified output exceeding the battery voltage (assuming 12 V) is short. Accordingly, the OFF period of the timer IC 34 (that is, the ON period of the thyristors SCR1, SCR2) is prolonged to equalize the area of the hatched zone.

Therefore, the batteries 2 having different nominal voltages may be properly charged. Besides, since the effective value of the charging current is constant, the current value per unit time is not changed even when the supply voltage rises, so that heat generation of the circuit may be suppressed.

Figure 12A:
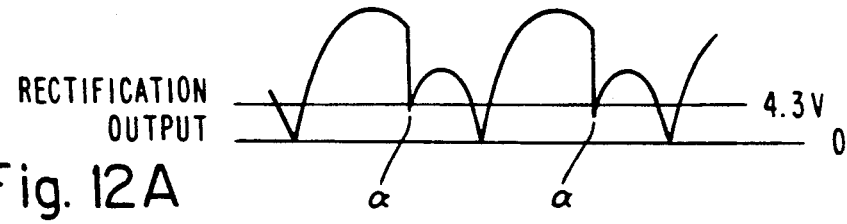
FIGS. 12A and 12B are diagrams for explaining the role of a switching transistor DT3.
Figure 12B:
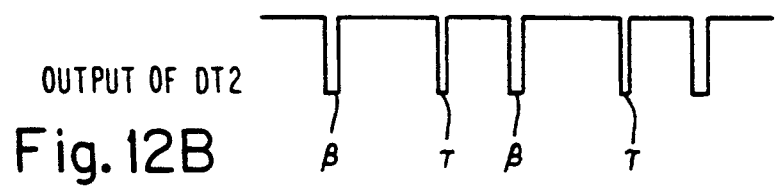

The role of the switching transistor DT3 in the control circuit 22 in FIG. 4 is explained below. This switching transistor DT3 is provided in order to prevent malfunction. The rectified output drops instantly at point $\alpha$ when the thyristors SCR1, SCR2 are ON, as shown in FIG. 12A. Accordingly, the zero point detecting circuit 28 misjudges it as the zero point, and a false zero-cross signal $\gamma$ may be delivered as shown in FIG. 12B. When charging of the capacitor C2 is once started by the false zero-cross signal $\gamma$, when a true zero-cross signal $\beta$ is later fed, the capacitor C2 is not discharged, and charging continues. As a result, the timer IC 34 malfunctions.

Accordingly, correct operation is guaranteed by discharging the capacitor C2 by the input of true zero-cross signal $\beta$ from the switching transistor DT3. Since this phenomenon particularly occurs when the nominal voltage of the battery to be charged is low, and it is effective when use of battery of low nominal voltage is expected.

Next is described the correction circuit of the current effective value calculating circuit 24. The correction circuit is required for the following reason. As stated above, the effective value of the charging current is constantly controlled by the control of the conduction angle; however, the peak value of the charging current is larger when the nominal voltage of the battery is lower, and is smaller when the nominal voltage is higher. Incidentally, since the heat loss due to the current is proportional to the square of the current, when the peak value is high, even when the effective value is the same, the heat generation of each element of the charger is substantially increased. This is a serious problem considering the deterioration or destruction of elements by heat.

Accordingly, by installing the correction circuit, a larger measured value than the actual effective value of the charging current is delivered to the control circuit when the peak value of the charging current is large, and the control circuit decreases the effective value of the actually flowing charging current. As a result, heat generation is reduced as far as possible. In this embodiment, the correction circuit is composed of the resistance R7 connected to the integrator 30 and the diode D8 connected in parallel thereto. The integration output of the integrator 30 is proportional to $1/(R7+R8)$. However, when the input exceeds the forward voltage of the diode D8, the resistance R7 is short-circuited, and the integration output is proportional to $1/R8$. Accordingly, the integration output is greater when the region of the large peak value of the charging current is wider. Hence, the wider the region of the large peak value of the charging current, the smaller is controlled the effective value of the charging current.

Supposing the resistance R7 to be 6.2 kilo-ohms and the resistance R8 to be 4.3 kilo-ohms, the difference in the current effective value due to difference in the nominal voltage of the battery is shown in FIG. 13. A line J denotes the charging current to the battery with the nominal voltage of 12 V, and a line K refers to the charging current to the battery with the nominal voltage of 2.4 V. As clear from the diagram, the current is smaller by about 60 to 70 mA on the curve K due to the effect of the correction circuit.

Lastly is explained the operation of a charge stop and hold circuit 50 in FIG. 4. In usual charging, the transistors DT9, DT10 are not conducting. Therefore, the gate driving current of the thyristors SCR1, SCR2 flows from the resistance R4 through the diode D3 or D4.

When the thermostat TH is open at the moment of full charge, the capacitor C3 is charged, and the transistor DT9 becomes ON. Accordingly, the gate driving current of the thyristors SCR1, SCR2 runs through the diodes D9 and transistor DT9, so that the thyristors SCR1, SCR2 are not driven. As a result, charging is stopped.

Once the transistor DT9 conducts, in this way, the transistor DT10 also conducts, and even after closing of the thermostat TH, the base current enough to conduct the transistor DT9 flows, and the conductive state of the transistor DT9 is maintained.

Sequentially, when the battery 2 is taken out, the transistor DT7 is turned off and the transistor DT8 is turned on, then the base voltage of the transistor DT9 becomes zero, so that the transistor DT9 is turned off. In consequence, the gate driving current flows into the thyristors SCR1, SCR2, and it is ready to start charging.

In the foregoing embodiment, a signal inversely proportional to the current effective value is applied to the control circuit 22, but, instead, a normally proportional signal may be also applied. In this case, the thyristors should be turned on during the H period of the timer IC 34.

It is a primary feature of the battery charger and method of the invention to control the conduction angle of the current flowing in the battery depending on the effective value by measuring the effective value of the charging current. Therefore, when charging batteries with different nominal voltages or when there are fluctuations in the supply voltage, the effective value of the charging current may be kept constant.

That is, the invention presents a battery charger which can be commonly used regardless of the nominal voltage and is free from effects of fluctuations of the supply voltage without the microcomputer.

It is another feature of the battery charger of the invention that the current effective value calculating circuit comprises a correction circuit which delivers a larger current effective value than the actual current effective value when the instantaneous value of the charging current is higher. Hence, when the instantaneous value of the charging current is higher, the heat generation of the elements may be suppressed. That is, a battery charger of higher reliability may be presented.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A battery charger comprising:
   a rectifier circuit for rectifying an alternating current to obtain a rectified output signals;
   a control circuit for applying a controlled conduction angle portion of the rectified output signal to a battery in response to a current measurement signal and a zero-cross signal;
   a current effective value calculating circuit responsive to charging current passing through the battery for calculating an effective value of said charging current to produce the current measurement signal for use by said control circuit, wherein the current effective valye calculating circuit comprises a correction circuit which delivers a current measurement signal which is larger than the actual effective value of said charging current when the instantaneous value of the charging current is high; and
   a zero point detecting circuit responsive to the rectified output signal for detecting a zero point of the rectified output signal to produce the zero-cross signal for use by said control circuit.

2. A battery charger according to claim 1, wherein the current effective value calculating circuit comprises a shunt resistance connected in series with the battery, a circuit for integrating the voltage across the shunt resistance, and a circuit for comparing an output of the integrating circuit with a reference voltage.

3. A battery charger according to claim 1, wherein the current effective value calculating circuit comprises
   (i) a shunt resistance connected in series with the battery,
   (ii) a circuit for integrating a voltage across the shunt resistance, and
   (iii) a circuit for comparing an output of the integrating circuit with a reference voltage; and
   the correction circuit comprises a diode and a resistance connected in parallel with the diode installed between the shunt resistance and the integrating circuit.

4. A battery charger comprising:
   a rectifier circuit for rectifying an alternating current to obtain a rectified output signal;
   a current effective value calculating circuit responsive to charging current passing through the battery for calculating an effective value of said charging current to produce a current measurement signal;
   a zero point detecting circuit responsive to the rectified output signal for detecting a zero point of the rectified output signal to produce a zero-cross signal; and
   a control circuit for applying a controlled conduction angle portion of the rectified output signal to a battery in response to said current measurement signal and said zero-cross signal, wherein the conduction angle control circuit comprises
   (i) a time constant circuit having a resistance, and having a capacitor charged by the current measurement signal,
   (ii) a timer circuit triggered in response to said zero-cross signal for producing an output pulse signal a duration of which depends on the charging of the capacitor of the time constant circuit by the current measurement signal, and
   (iii) a circuit for switching the controlled conduction angle portion of the rectified output signal through to the battery, the switching circuit being controlled by the duration of the output from the timer circuit.

5. A charging method of rectifying an alternating current to apply to a battery, comprising the steps of:
   measuring an effective value of a rectified alternating charging current applied to a battery;
   controlling a conduction angle of the rectified alternating charging current applied to the battery in response to the measured effective current value; and
   correcting the measured effective current value to produce a measured value higher than the actual effective value when a momentary value of charging current is high.

* * * * *